(12) United States Patent
Liu et al.

(10) Patent No.: US 8,238,451 B2
(45) Date of Patent: Aug. 7, 2012

(54) NETWORK TRANSMITTING APPARATUS AND POWER SAVING METHOD THEREOF

(75) Inventors: Tsu-Chun Liu, Hsin-Chu (TW); Liang-Ping Lin, Hsin-Chu (TW)

(73) Assignee: IC Plus Corp., Hsin-Chu (TW)

( * ) Notice: Subject to any disclaimer, the term of this patent is extended or adjusted under 35 U.S.C. 154(b) by 804 days.

(21) Appl. No.: 12/388,757

(22) Filed: Feb. 19, 2009

(65) Prior Publication Data

US 2010/0118984 A1    May 13, 2010

(30) Foreign Application Priority Data

Nov. 11, 2008    (TW) ................................ 97143526 A

(51) Int. Cl.
*H04B 3/00* (2006.01)

(52) U.S. Cl. ........ 375/258; 375/257; 375/319; 375/288; 375/295; 375/220

(58) Field of Classification Search .................. 375/258, 375/257, 319, 288, 295, 220
See application file for complete search history.

(56) References Cited

U.S. PATENT DOCUMENTS

| | | | |
|---|---|---|---|
| 7,660,345 B2 * | 2/2010 | Yu | 375/222 |
| 2007/0053211 A1 * | 3/2007 | Lanni | 363/20 |
| 2008/0137759 A1 * | 6/2008 | Cai et al. | 375/257 |
| 2009/0210725 A1 * | 8/2009 | Kim et al. | 713/300 |

* cited by examiner

*Primary Examiner* — Siu Lee
(74) *Attorney, Agent, or Firm* — J.C. Patents

(57) ABSTRACT

A network transmitting apparatus and a power saving method thereof are provided. The network transmitting apparatus includes a chip, a transformer, and a power regulating unit. The chip includes a detecting and controlling unit, an analog circuit, and a digital circuit. The detecting and controlling unit receives a received signal and detects the received signal and a state of the chip to generate a first control signal. The transformer has a first side coupled to the chip and a second side. The power regulating unit coupled to the detecting and controlling unit and a center tap of the first side of the transformer is used for receiving a voltage, generating a first regulated voltage according to the first control signal, and connecting the first regulated voltage to the center tap of the first side of the transformer, the analog circuit, and the digital circuit.

22 Claims, 3 Drawing Sheets

NETWORK TRANSMITTING APPARATUS AND POWER SAVING METHOD THEREOF

CROSS-REFERENCE TO RELATED APPLICATION

This application claims the priority benefit of Taiwan application serial no. 97143526, filed on Nov. 11, 2008. The entirety of the above-mentioned patent application is hereby incorporated by reference herein and made a part of this specification.

BACKGROUND OF THE INVENTION

1. Field of the Invention

The present invention generally relates to a network transmitting apparatus, in particular, to a network transmitting apparatus and a power saving method applied to a network transmitting apparatus.

2. Description of Related Art

With the rapid development of electronic technologies, computers and various information digitized equipments become increasingly prevailing. In order to share the resources, the network plays an essential role for information exchange. Among various different network configurations, Ethernet has the advantages of easy access, convenient erection, high transmission speed and the like, and thus relevant equipments of the Ethernet have developed vigorously and the transmission rate thereof has been increased from 10 Mbps to 100 Mbps or even 1000 Mbps.

In a network transmitting apparatus of the Ethernet, the current network transmission speeds can be classified into 10 M, 100 M, and 1000 M. During the transmission of a network signal, a transmission voltage of the network transmitting apparatus varies with the network transmission speed. For example, when the network transmission speed is 10 Mbps, the transmission voltage of the network transmitting apparatus is, for example, about ±2.5 volts (V). When the network transmission speed is 100 Mbps, the transmission voltage of the network transmitting apparatus is, for example, about ±1 V. When the network transmission speed is 1000 Mbps, the transmission voltage of the network transmitting apparatus is, for example, about ±1 V, and a receiving voltage thereof is, for example, about ±1 V at a shorter cable length and a maximum voltage thereof may reach about ±2 V.

However, the network transmitting apparatus does not always maintain the same network transmission speed during data transmission. In order to maintain the normal operation of the network transmitting apparatus, i.e., to enable the network transmitting apparatus to transmit data at different network transmission speeds, a maximum voltage value of the three levels (the network transmission speeds of 10 Mbps, 100 Mbps, and 1000 Mbps), i.e., ±2.5 V, must be provided, which thus results in an excessive power consumption of the network transmitting apparatus.

SUMMARY OF THE INVENTION

Accordingly, the present invention is directed to a network transmitting apparatus and a power saving method thereof, thereby achieving the purpose of power saving.

As embodied and broadly described herein, the present invention provides a network transmitting apparatus, which includes a chip, a transformer, and a power regulating unit. The chip includes a detecting and controlling unit, an analog circuit, and a digital circuit. The detecting and controlling unit receives a received signal and detects the received signal and a state of the chip to generate a first control signal. The transformer has a first side coupled to the chip and a second side. The power regulating unit coupled to the detecting and controlling unit and a center tap of the first side of the transformer is used for receiving a voltage, generating a first regulated voltage according to the first control signal, and transmitting the first regulated voltage to the center tap of the first side of the transformer, the analog circuit, and the digital circuit.

In an embodiment of the present invention, when the detecting and controlling unit detects that the received signal carries information of a network transmission speed, a direct current (DC) wander, a transmit amplitude, and a cable length and generates the first control signal, the first regulated voltage generated by the power regulating unit is transmitted to the center tap of the first side of the transformer.

In an embodiment of the present invention, when the detecting and controlling unit detects that the received signal processed with a signal-to-noise rate (SNR) and generates the first control signal, the first regulated voltage generated by the power regulating unit is transmitted to the analog circuit.

In an embodiment of the present invention, when the detecting and controlling unit detects a magnitude of an internal delay of the chip and generates the first control signal, the first regulated voltage generated by the power regulating unit is transmitted to the digital circuit.

In an embodiment of the present invention, the detecting and controlling unit further detects the received signal to generate a second control signal correspondingly, and the power regulating unit further generates a second regulated voltage according to the second control signal and transmits the first regulated voltage and the second regulated voltage to two units selected from the center tap of the first side of the transformer, the analog circuit, and the digital circuit respectively.

In an embodiment of the present invention, when the detecting and controlling unit detects that the received signal carries information of a network transmission speed, a DC-wander, a transmit amplitude, and a cable length and generates the first control signal, the first regulated voltage generated by the power regulating unit is transmitted to the center tap of the first side of the transformer, and when the detecting and controlling unit detects that the received signal processed with a SNR and generates the second control signal, the second regulated voltage generated by the power regulating unit is transmitted to the analog circuit.

In an embodiment of the present invention, when the detecting and controlling unit detects a magnitude of an internal delay of the chip and generates the first control signal, the first regulated voltage generated by the power regulating unit is transmitted to the digital circuit, and when the detecting and controlling unit detects that the received signal carries information of a network transmission speed, a DC-wander, a transmit amplitude, and a cable length and generates the second control signal, the second regulated voltage generated by the power regulating unit is transmitted to the center tap of the first side of the transformer.

In an embodiment of the present invention, when the detecting and controlling unit detects a magnitude of an internal delay of the chip and generates the first control signal, the first regulated voltage generated by the power regulating unit is transmitted to the digital circuit, and when the detecting and controlling unit detects that the received signal processed with a SNR and generates the second control signal, the second regulated voltage generated by the power regulating unit is transmitted to the analog circuit.

In an embodiment of the present invention, when the detecting and controlling unit detects the received signal to generate the first control signal, the detecting and controlling unit further detects the state of the chip to generate a third control signal, and the power regulating unit further generates a third regulated voltage according to the third control signal and transmits the first regulated voltage, the second regulated voltage, and the third regulated voltage to the center tap of the first side of the transformer, the analog circuit, and the digital circuit respectively.

In an embodiment of the present invention, when the detecting and controlling unit detects that the received signal carries information of a network transmission speed, a DC-wander, a transmit amplitude, and a cable length and generates the first control signal, the first regulated voltage generated by the power regulating unit is transmitted to the center tap of the first side of the transformer; when the detecting and controlling unit detects that the received signal processed with a SNR and generates the second control signal, the second regulated voltage generated by the power regulating unit is transmitted to the analog circuit; and when the detecting and controlling unit detects a magnitude of an internal delay of the chip and generates the third control signal, the third regulated voltage generated by the power regulating unit is transmitted to the digital circuit.

In an embodiment of the present invention, the network transmitting apparatus further includes a first resistor and a second resistor. A first end of the first resistor is coupled to a first end of the first side of the transformer. A first end of the second resistor is coupled to a second end of the first resistor and a second end of the second resistor is coupled to a second end of the first side of the transformer.

In an embodiment of the present invention, the voltage is an operating voltage.

The present invention further provides a power saving method of a network transmitting apparatus. The network transmitting apparatus includes a chip and a transformer, in which the chip has an analog circuit and a digital circuit. The power saving method includes the following steps. First, a received signal is received. Afterwards, the received signal or a state of the chip is detected to generate a first control signal. Then, a first regulated voltage is generated correspondingly according to the first control signal. Afterwards, the first regulated voltage is transmitted to the center tap of a first side of the transformer, the analog circuit, and the digital circuit.

In an embodiment of the present invention, when it is detected that the received signal carries information of a network transmission speed, a DC-wander, a transmit amplitude, and a cable length, the first regulated voltage is transmitted to the center tap of the first side of the transformer.

In an embodiment of the present invention, when it is detected that the received signal processed with a SNR, the first regulated voltage is transmitted to the analog circuit.

In an embodiment of the present invention, when a magnitude of an internal delay of the chip is detected, the first regulated voltage is transmitted to the digital circuit.

In an embodiment of the present invention, the power saving method of the network transmitting apparatus further includes the following steps. First, the received signal is detected to generate a second control signal. Then, a second regulated voltage is generated correspondingly according to the second control signal. Afterwards, the first regulated voltage and the second regulated voltage are respectively transmitted to two units selected from the center tap of the first side of the transformer, the analog circuit, and the digital circuit.

In an embodiment of the present invention, when it is detected that the received signal carries information of a network transmission speed, a DC-wander, a transmit amplitude, and a cable length, the first control signal is generated and the first regulated voltage is transmitted to the center tap of the first side of the transformer, and when it is detected that the received signal processed with a SNR, the second control signal is generated and the second regulated voltage is transmitted to the analog circuit.

In an embodiment of the present invention, when a magnitude of an internal delay of the chip is detected, the first control signal is generated and the first regulated voltage is transmitted to the digital circuit, and when it is detected that the received signal carries information of a network transmission speed, a DC-wander, a transmit amplitude, and a cable length, the second control signal is generated and the second regulated voltage is transmitted to the center tap of the first side of the transformer.

In an embodiment of the present invention, when a magnitude of an internal delay of the chip is detected, the first control signal is generated and the first regulated voltage is transmitted to the digital circuit, and when it is detected that the received signal processed with a SNR, the second control signal is generated and the second regulated voltage is transmitted to the analog circuit.

In an embodiment of the present invention, when detecting the received signal to generate the first control signal, the power saving method further includes the following steps. First, the state of the chip is detected to generate a third control signal. Then, a third regulated voltage is generated correspondingly according to the third control signal. Afterwards, the first regulated voltage, the second regulated voltage, and the third regulated voltage are respectively transmitted to the center tap of the first side of the transformer, the analog circuit, and the digital circuit.

In an embodiment of the present invention, when it is detected that the received signal carries information of a network transmission speed, a DC-wander, a transmit amplitude, and a cable length, the first control signal is generated and the first regulated voltage is transmitted to the center tap of the first side of the transformer; when it is detected that the received signal processed with a SNR, the second control signal is generated and the second regulated voltage is transmitted to the analog circuit; and when a magnitude of an internal delay of the chip is detected, the third control signal is generated and the third regulated voltage is transmitted to the digital circuit.

In the present invention, the detecting and controlling unit detects the information carried by the received signal (i.e., the network transmission speed, the DC-wander, and the SNR of the received signal) and the state of the chip (the magnitude of the internal delay of the chip) to correspondingly generate the first control signal, the second control signal, and the third control signal. Then, the power regulating unit generates the first regulated voltage, the second regulated voltage, and the third regulated voltage according to the first control signal, the second control signal, and the third control signal and transmits the first regulated voltage, the second regulated voltage, and the third regulated voltage to the center tap of the first side of the transformer, the analog circuit, and the digital circuit respectively. In this way, the present invention can save the power consumption of the network transmitting apparatus through dynamically regulating the voltages of the center tap of the first side of the transformer, the analog circuit, and the digital circuit. Although there are three regulated voltages mentioned in this invention, they are independent to each other and can exist alone respectively.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
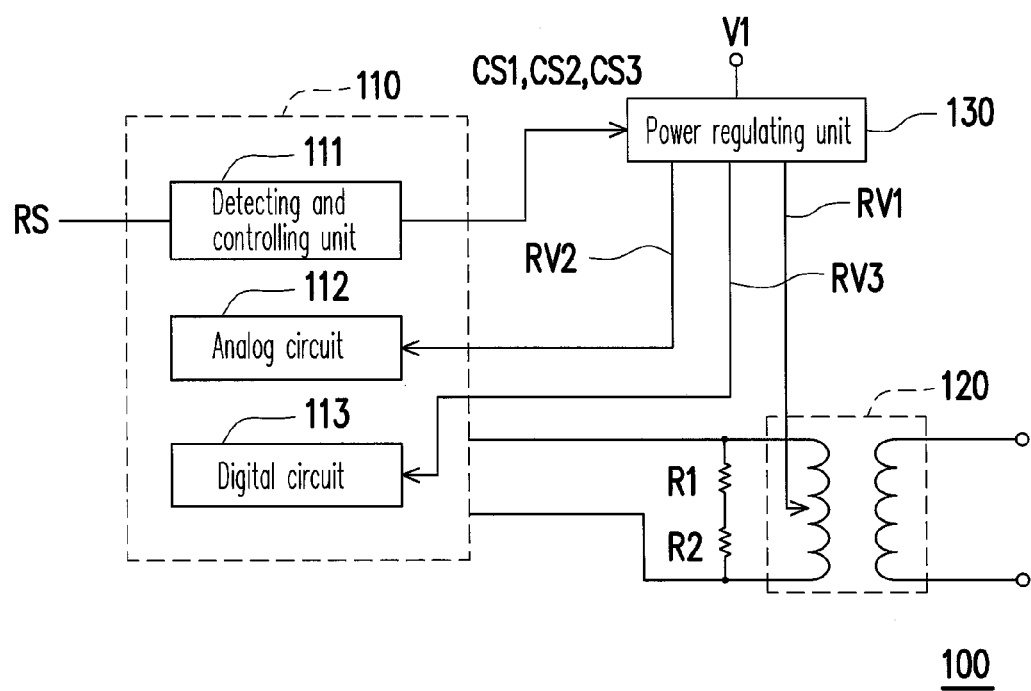
FIG. 1 is a circuit block diagram of a network transmitting apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a circuit block diagram of a network transmitting apparatus according to an embodiment of the present invention. A network transmitting apparatus 100 provided in this embodiment may be applied to a Gigabit Ethernet, but not limited thereto. Referring to FIG. 1, the network transmitting apparatus 100 includes a chip 100, a transformer 120, and a power regulating unit 130.

The chip 110 includes a detecting and controlling unit 111, an analog circuit 112, and a digital circuit 113. The detecting and controlling unit 111 receives a received signal RS and detects the received signal RS or a state of the chip 110, so as to correspondingly generate a first control signal CS1, a second control signal CS2, and a third control signal CS3. In this embodiment, the detecting and controlling unit 111 generates the first control signal CS1 when detecting that the received signal RS carries information of a network transmission speed, a DC-wander, a transmit amplitude, and a cable length.

Generally speaking, the network transmission speeds of the current network transmitting apparatus 100 are classified into 10 Mbps, 100 Mbps, and 1000 Mbps. An operating voltage of the network transmitting apparatus 100 varies with the network transmission speed. For example, when the network transmission speed is 10 Mbps, the transmission voltage of the network transmitting apparatus 100 is, for example, about ±2.5 V. When the network transmission speed is 100 Mbps, the transmission voltage of the network transmitting apparatus 100 is, for example, about ±1 V. When the network transmission speed is 1000 Mbps, the transmission voltage of the network transmitting apparatus 100 is, for example, about ±1 V, and a receiving voltage thereof is, for example, about ±1 V and a maximum voltage thereof may reach about ±2 V.

In addition, after the network transmitting apparatus receives the received signal RS, the DC-wander phenomenon possibly occurs to the received signal RS due to a DC loss of the transformer 120, and as a result, a DC voltage of the received signal RS is attenuated. In the network transmitting apparatus 100, the performance of the transmit amplitude of the received signal RS may also be taken as a basis for regulating the first regulated voltage RV1. The cable length may be determined according to an amplitude of the received signal RS, that is, at a shorter cable length, the amplitude of the transmitted signal may be reduced without sacrificing the performance.

Therefore, upon receiving the received signal RS, the detecting and controlling unit 111 detects that the received signal RS carries information of the network transmission speed, the DC-wander, the transmit amplitude, and the cable length, so as to generate the first control signal CS1, which is taken as a basis for the power regulating unit 130 to regulate a received voltage V1 to generate the first regulated voltage RV1.

For example, when detecting that the network transmission speed is 10 Mbps, the detecting and controlling unit 111 further calculates the DC-wander value in this state and detects the transmit amplitude and the cable length, so as to generate a first control signal CS1_1. When detecting that the network transmission speed is 100 Mbps, the detecting and controlling unit 111 further calculates the DC-wander value in this state and detects the transmit amplitude and the cable length, so as to generate a first control signal CS1_2. When detecting that the network transmission speed is 1000 Mbps, the detecting and controlling unit 111 further calculates the DC-wander value in this state and detects the transmit amplitude and the cable length, so as to generate a first control signal CS1_3. In this embodiment, when the network transmission speed is 10 Mbps, the received signal RS does not have the DC-wander phenomenon at all, and thus the DC-wander value thereof is zero.

In addition, the detecting and controlling unit 111 detects that the received signal RS processed with a signal-to-noise rate (SNR), so as to generate the second control signal CS2. For example, when detecting that the SNR of the received signal RS is high, the detecting and controlling unit 111 generates a second control signal CS2_1, which is taken as a basis for the power regulating unit 130 to decrease the received voltage V1 to generate a second regulated voltage RV2_1. When detecting that the SNR of the received signal RS is low, the detecting and controlling unit 111 generates a second control signal CS2_2, which is taken as a basis for the power regulating unit 130 to increase the received voltage V1 to generate a second regulated voltage RV2_2. In this embodiment, the second regulated voltages RV2_1 and RV2_2 may be analog voltages.

In addition, the detecting and controlling unit 11 generates the third control signal CS3 according to the state of the chip 110, i.e., a magnitude of an internal delay of the chip 110. For example, when detecting that the internal delay of the chip 110 is large, the detecting and controlling unit 111 generates a third control signal CS3_1, which is taken as a basis for the power regulating unit 130 to increase the received voltage V1 to generate a third regulated voltage RV3_1. When detecting that the internal delay of the chip 110 is small, the detecting and controlling unit 111 generates a third control signal CS3_2, which is taken as a basis for the power regulating unit 130 to decrease the received voltage V1 to generate a third regulated voltage RV3_2. In this embodiment, the third regulated voltages RV3_1 and RV3_2 may be digital voltages.

In this embodiment, the internal delay of the chip 110 is detected by means of configuring counters A and B in the detecting and controlling unit 111. The counter A is, for example, a counter having a fixed clock, and the clock of the counter B is, for example, provided by a ring oscillator and is variable in the magnitude. Therefore, once the chip 110 begins to be operated, both the counter A and the counter B start counting, and the values counted by the counter A and the counter B are calculated by statistics once in each cycle. If the value of the counter A is larger than that of the counter B, it indicates that the internal delay of the chip 110 is large. If the value of the counter A is smaller than that of the counter B, it indicates that the internal delay of the chip 110 is small.

Referring to FIG. 1, the transformer 120 has a first side and a second side, and the first side of the transformer 120 is coupled to the detecting and controlling unit 111. The power regulating unit 130 coupled to the detecting and controlling unit 111 and the transformer 120 is used for receiving the voltage (for example, an operating voltage of 3.3 V) V1, generating the first regulated voltage RV1, the second regulated voltage RV2, and the third regulated voltage RV3 according to the first control signal CS1, the second control signal CS2, and the third control signal CS3, and transmitting the first regulated voltage RV1, the second regulated voltage RV2, and the third regulated voltage RV3 to a center tap of the first side of the transformer 120, the analog circuit 112, and the digital circuit 113 respectively.

For example, according to the first control signal CS1 generated at the transmission speed of 10 Mbps, 100 Mbps, or 1000 Mbps at that time, the power regulating unit 130 generates the first regulated voltage RV1 for being connected to the center tap of the first side of the transformer 120. In this way, a voltage of the center tap of the first side of the transformer 120 retains the minimum level and meanwhile the normal operation of the network transmitting apparatus can be maintained, thereby effectively reducing the power consumption of the network transmitting apparatus.

An example is given below to illustrate how to select a minimum voltage Vct of the center tap of the first side of the transformer 120 according to the network transmission speed, the transmission voltage, the cable length, and the DC-wander at different network transmission speeds (10 Mbps, 100 Mbps, and 1000 Mbps).

When the network transmission speed is 10 Mbps, the minimum voltage Vct is calculated as "Vct−Transmission voltage/2≧Minimum internal operating voltage of the chip". It is assumed that the transmission voltage is 2.5 V and the minimum internal operating voltage of the transformer 120 is 0.6 V. Therefore, Vct−2.5/2≧0.6, i.e., Vct≧1.85 V.

When the network transmission speed is 100 Mbps, the minimum voltage Vct is calculated as "Vct−Transmission voltage/2−DC-wander/2≧Minimum internal operating voltage of the chip". It is assumed that the transmission voltage is 1 V and the minimum internal operating voltage of the transformer 120 is 0.6 V Therefore, Vct−½−DC-wander/2≧0.6, i.e., Vct≧1.1+DC-wander/2. Here, it is assumed that the DC-wander value<0.8. Therefore, Vct=1.1~1.5 V.

When the network transmission speed is 1000 Mbps, the minimum voltage Vct is calculated as "Vct−Transmission voltage/2−Receiving voltage/2−DC-wander/2≧Minimum internal operating voltage of the chip". It is assumed that the minimum internal operating voltage of the transformer 120 is 0.6 V. At a shorter cable length, the transmission voltage may be reduced to 0.8 V and the receiving voltage is 1 V. At a longer cable length, the transmission voltage is 1 V and the receiving voltage is 0.8 V. Here, it is assumed that the DC-wander value<0.6, which is substituted to the above equation, so as to obtain Vct=1.5~1.8 V.

In addition, after receiving the second control signal CS2_1 (the SNR of the received signal RS is high), the power regulating unit 130 generates the second regulated voltage RV2_1 (i.e., decreasing the voltage of the analog circuit 112) and transmits the second regulated voltage RV2_1 to the analog circuit 112 in the chip 110. After receiving the second control signal CS2_2 (the SNR of the received signal RS is low), the power regulating unit 130 generates the second regulated voltage RV2_2 (i.e., increasing the voltage of the analog circuit 112) and transmits the second regulated voltage RV2_2 to the analog circuit 112 in the chip 110. In this manner, the power consumption of the network transmitting apparatus may be reduced effectively.

In addition, after receiving the third control signal CS3_1 (the internal delay of the chip 110 is small), the power regulating unit 130 generates the third regulated voltage RV3_1 (i.e., decreasing the voltage of the digital circuit 113) and transmits the third regulated voltage RV3_1 to the digital circuit 113 in the chip 110. After receiving the third control signal CS3_2 (the internal delay of the chip 110 is large), the power regulating unit 130 generates the third regulated voltage RV3_2 (i.e., increasing the voltage of the digital circuit 113) and transmits the third regulated voltage RV3_2 to the digital circuit 113 in the chip 110.

Referring to FIG. 1, the network transmitting apparatus 100 further includes a resistor R1 and a resistor R2. A first end of the resistor R1 is coupled to a first end of the first side of the transformer 120. A first end of the resistor R2 is coupled to a second end of the resistor R1 and a second end of the resistor R2 is coupled to a second end of the first side of the transformer 120. In this embodiment, the resistance of the resistors R1 and R2 is, for example but not limited to, 50 ohm (Ω).

It should be noted that, in the above embodiment, the detecting and controlling unit 111 generates the first control signal CS1, the second control signal CS2, and the third control signal at the same time, such that the first regulated voltage RV1, the second regulated voltage RV2, or the third regulated voltage RV3 is respectively generated, thereby enabling the network transmitting apparatus 100 to achieve the power saving efficacy. However, the present invention is not limited to generating the first control signal CS1, the second control signal CS2, and the third control signal CS3 at the same time. Instead, the detecting and controlling unit 111 may further generate a control signal according to the network transmission speed, the DC-wander, the transmit amplitude, and the cable length in the received signal RS to regulate the regulated voltage to be transmitted to the center tap of the first side of the transformer 120, so as to save the power consumption of the network transmitting apparatus. Alternatively, the detecting and controlling unit 111 may further generate a control signal according to the SNR of the received signal RS to regulate the regulated voltage to be transmitted to the analog circuit 112 of the chip 110, so as to save the power consumption of the network transmitting apparatus. Alternatively, the detecting and controlling unit 111 may detect the internal delay of the chip 110 to generate a control signal to regulate the regulated voltage to be transmitted to the digital circuit 113 in the chip 110, so as to save the power consumption of the network transmitting apparatus.

Figure 2:
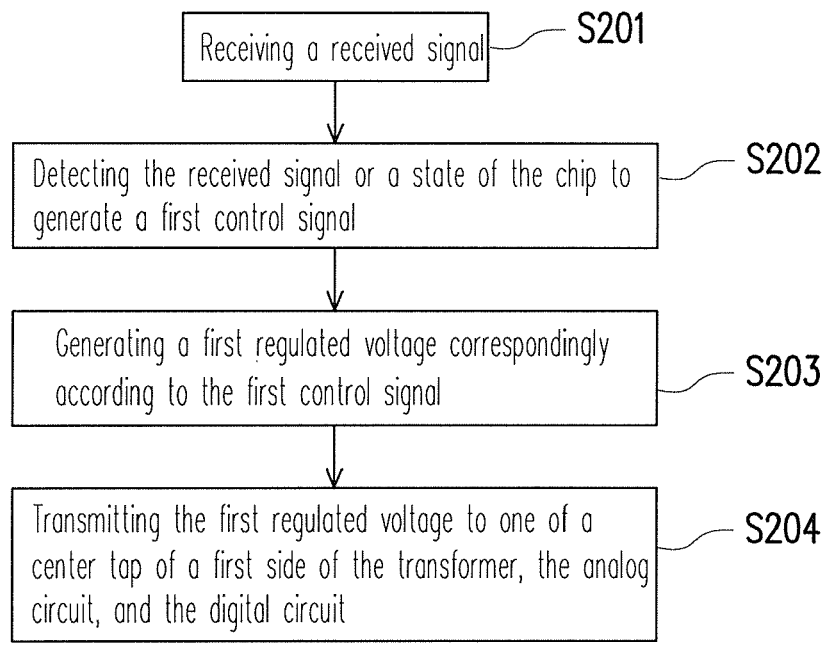
FIG. 2 is a flow chart of a power saving method of a network transmitting apparatus according to an embodiment of the present invention.

In view of the illustrations of the above embodiment, a power saving method of a network transmitting apparatus may be concluded. FIG. 2 is a flow chart of a power saving method of a network transmitting apparatus according to an embodiment of the present invention. In this embodiment, the network transmitting apparatus includes a detecting and controlling unit, a chip, and a transformer, in which the chip has an analog circuit and a digital circuit. Referring to FIG. 2, first, in Step S201, a received signal is received. For example, the received signal is received by the detecting and controlling unit. In Step S202, a first control signal is generated by detecting the received signal or a state of the chip. In this embodiment, the detecting and controlling unit detects that the received signal carries information of a network transmission speed, a DC-wander, a transmit amplitude, and a cable length, thereby generating the first control signal. Alternatively, the detecting and controlling unit detects that the received signal processed with a SNR, thereby generating the first control signal. Alternatively, the detecting and controlling unit detects a magnitude of an internal delay of the chip, thereby generating the first control signal.

In Step S203, a first regulated voltage is generated correspondingly according to the first control signal. In Step S204, the first regulated voltage is transmitted to the center tap of a first side of the transformer, the analog circuit, and the digital circuit. In this embodiment, if the first regulated voltage is generated according to the information of the network transmission speed, the DC-wander, the transmit amplitude, and the cable length carried by the received signal, the first regulated voltage is transmitted to the center tap of the first side of the transformer. If the first regulated voltage is generated according to the SNR carried by the received signal, the first regulated voltage is transmitted to the analog circuit. Alternatively, if the first regulated voltage is generated according to the magnitude of the internal delay of the chip, the first regulated voltage is transmitted to the digital circuit of the chip. In this manner, the power consumption of the network transmitting apparatus can be reduced through dynamically regulating the voltage transmitted to the center tap of the first side of the transformer, the analog circuit, or the digital circuit.

Figure 3:
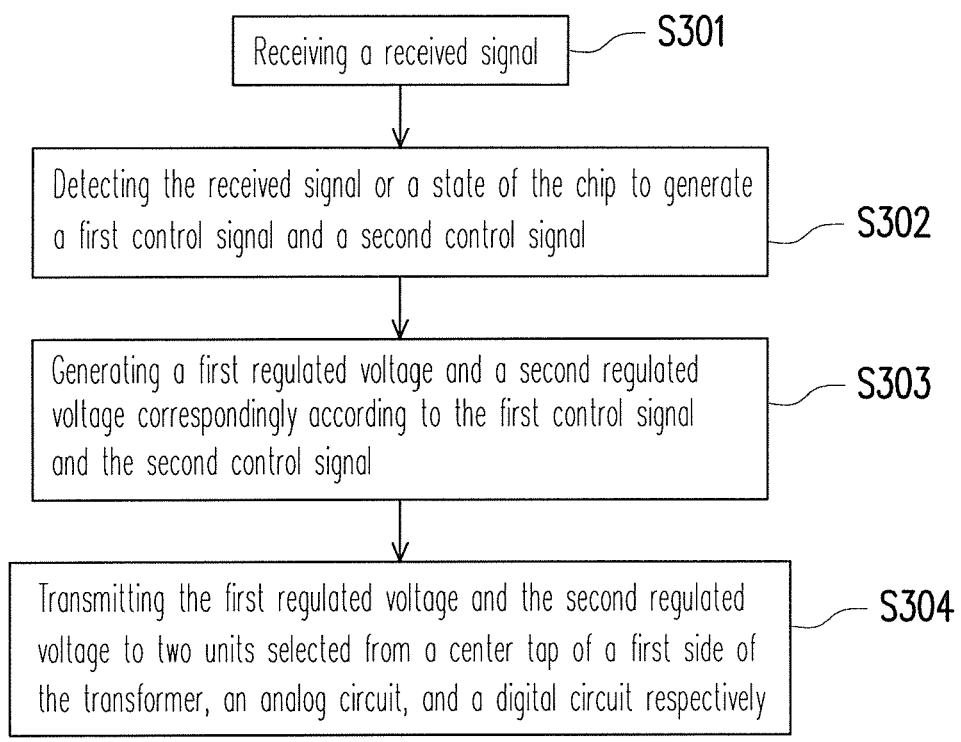
FIG. 3 is a flow chart of a power saving method of a network transmitting apparatus according to another embodiment of the present invention.

FIG. 3 is a flow chart of a power saving method of a network transmitting apparatus according to another embodiment of the present invention. Referring to FIG. 3, first, in Step S301, a received signal is received. For example, the received signal is received by the detecting and controlling unit. In Step S302, the received signal or a state of the chip is detected to generate a first control signal and a second control signal. In this embodiment, the first control signal is generated when the detecting and controlling unit detects that the received signal carries information of a network transmission speed, a DC-wander, a transmit amplitude, and a cable length, and the second control signal is generated when the detecting and controlling unit detects that the received signal processed with a SNR. Alternatively, the first control signal is generated when the detecting and controlling unit detects a magnitude of an internal delay of the chip, and the second control signal is generated when the detecting and controlling unit detects that the received signal carries information of a network transmission speed, a DC-wander, a transmit amplitude, and a cable length. Alternatively, the first control signal is generated when the detecting and controlling unit detects a magnitude of an internal delay of the chip, and the second control signal is generated when the detecting and controlling unit detects that the received signal processed with a SNR.

In Step S303, a first regulated voltage and a second regulated voltage are generated correspondingly according to the first control signal and the second control signal. In Step S304, the first regulated voltage and the second regulated voltage are respectively transmitted to two units selected from a center tap of a first side of the transformer, an analog circuit, and a digital circuit. Therefore, the power consumption of the network transmitting apparatus is effectively reduced through regulating the voltages transmitted to the two units selected from the center tap of the first side of the transformer, the analog circuit, and the digital circuit at the same time.

Figure 4:
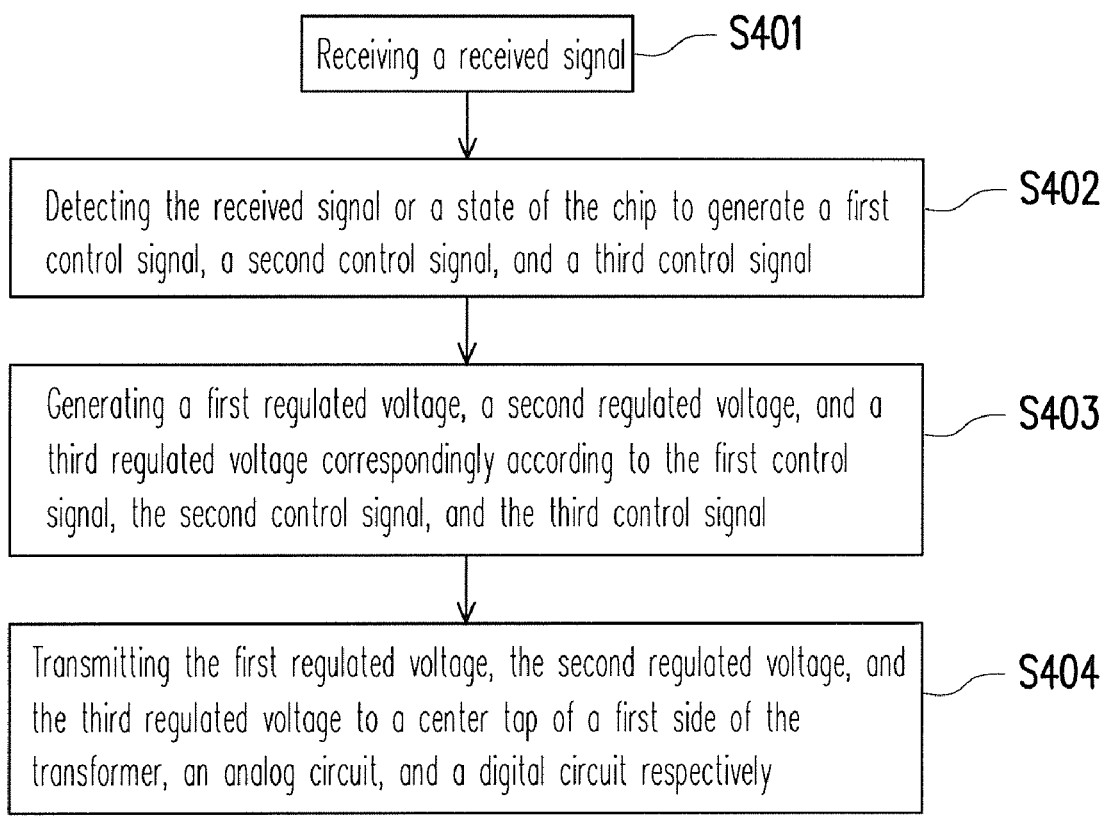
FIG. 4 is a flow chart of a power saving method of a network transmitting apparatus according to still another embodiment of the present invention.

FIG. 4 is a flow chart of a power saving method of a network transmitting apparatus according to still another embodiment of the present invention. Referring to FIG. 4, first, in Step S401, a received signal is received. For example, the received signal is received by the detecting and controlling unit. In Step S402, the received signal or a state of the chip is detected to generate a first control signal, a second control signal, and a third control signal. In this embodiment, the first control signal is generated when the detecting and controlling unit detects that the received signal carries information of a network transmission speed, a DC-wander, a transmit amplitude, and a cable length; the second control signal is generated when the detecting and controlling unit detects that the received signal processed with a SNR; and the third control signal is generated when the detecting and controlling unit detects a magnitude of an internal delay of the chip.

In Step S403, a first regulated voltage, a second regulated voltage, and a third regulated voltage are correspondingly generated according to the first control signal, the second control signal, and the third control signal. In Step S404, the first regulated voltage, the second regulated voltage, and the third regulated voltage are respectively transmitted to a center tap of a first side of the transformer, the analog circuit, and the digital circuit. Therefore, the power consumption of the network transmitting apparatus is effectively reduced through regulating the voltages transmitted to the center tap of the first side of the transformer, the analog circuit, and the digital circuit at the same time.

To sum up, in the present invention, the detecting and controlling unit detects the information (i.e., the network transmission speed, the DC-wander, and the SNR of the received signal) carried by the received signal and the state of the chip (the magnitude of the internal delay of the chip) to correspondingly generate the first control signal, the second control signal, and the third control signal. Then, the power regulating unit generates the first regulated voltage, the second regulated voltage, and the third regulated voltage according to the first control signal, the second control signal, and the third control signal and transmits the first regulated voltage, the second regulated voltage, and the third regulated voltage to the center tap of the first side of the transformer, the analog circuit, and the digital circuit respectively. In this way, the present invention can save the power consumption of the network transmitting apparatus through dynamically regulating the voltages of the center tap of the first side of the transformer, the analog circuit, and the digital circuit. Although there are three regulated voltages mentioned in this invention, they are independent to each other and can exist alone respectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network transmitting apparatus, comprising:
 a chip, comprising:
  a detecting and controlling unit, for receiving a received signal and detecting the received signal or a state of the chip to generate a first control signal, a second control signal or a third control signal;
  an analog circuit; and
  a digital circuit;
 a transformer, comprising a first side and a second side, wherein the first side of the transformer is coupled to the chip; and
 a power regulating unit, coupled to the detecting and controlling unit and a center tap of the first side of the transformer, for receiving a voltage, generating a first regulated voltage, a second regulated voltage or a third regulated voltage according to the first control signal, the second control signal or the third control signal respectively, and respectively transmitting the first regulated voltage, the second regulated voltage or the third regulated voltage to the center tap of the first side of the transformer, the analog circuit, or the digital circuit.

2. The network transmitting apparatus according to claim 1, wherein when the detecting and controlling unit detects that the received signal carries information of a network transmission speed, a direct current (DC) wander, a transmit amplitude, and a cable length and generates the first control signal, the first regulated voltage generated by the power regulating unit is transmitted to the center tap of the first side of the transformer.

3. The network transmitting apparatus according to claim 1, wherein when the detecting and controlling unit detects that the received signal processed with a signal-to-noise rate (SNR) and generates the second control signal, the second regulated voltage generated by the power regulating unit is transmitted to the analog circuit.

4. The network transmitting apparatus according to claim 1, wherein when the detecting and controlling unit detects a magnitude of an internal delay of the chip and generates the third control signal, the third regulated voltage generated by the power regulating unit is transmitted to the digital circuit.

5. The network transmitting apparatus according to claim 1, wherein:
when the detecting and controlling unit detects the received signal to generate the first control signal and the second control signal, the power regulating unit respectively generates the first regulated voltage and the second regulated voltage correspondingly according to the first control signal and the second control signal and respectively transmits the first regulated voltage and the second regulated voltage to the center tap of the first side of the transformer and the analog circuit;
when the detecting and controlling unit detects the received signal to generate the first control signal and the third control signal, the power regulating unit respectively generates the first regulated voltage and the third regulated voltage correspondingly according to the first control signal and the third control signal and respectively transmits the first regulated voltage and the third regulated voltage to the center tap of the first side of the transformer and the digital circuit; and
when the detecting and controlling unit detects the received signal to generate the second control signal and the third control signal, the power regulating unit respectively generates the second regulated voltage and the third regulated voltage correspondingly according to the second control signal and the third control signal and respectively transmits the second regulated voltage and the third regulated voltage to the analog circuit and the digital circuit.

6. The network transmitting apparatus according to claim 5, wherein when the detecting and controlling unit detects that the received signal carries information of a network transmission speed, a DC-wander, a transmit amplitude, and a cable length, the detecting and controlling unit generates the first control signal, and when the detecting and controlling unit detects that the received signal processed with a SNR, the detecting and controlling unit generates the second control signal.

7. The network transmitting apparatus according to claim 5, wherein when the detecting and controlling unit detects a magnitude of an internal delay of the chip, the detecting and controlling unit generates the third control signal, and when the detecting and controlling unit detects that the received signal carries information of a network transmission speed, a DC-wander, a transmit amplitude, and a cable length, the detecting and controlling unit generates the first control signal.

8. The network transmitting apparatus according to claim 5, wherein when the detecting and controlling unit detects a magnitude of an internal delay of the chip, the detecting and controlling unit generates the third control signal and when the detecting and controlling unit detects that the received signal processed with a SNR, the detecting and controlling unit generates the second control signal.

9. The network transmitting apparatus according to claim 5, wherein when the detecting and controlling unit detects the received signal to generate the first control signal and the second control signal, the detecting and controlling unit further detects the state of the chip to generate the third control signal, and the power regulating unit further generates the third regulated voltage according to the third control signal and respectively transmits the first regulated voltage, the second regulated voltage, and the third regulated voltage to the center tap of the first side of the transformer, the analog circuit, and the digital circuit.

10. The network transmitting apparatus according to claim 9, wherein when the detecting and controlling unit detects that the received signal carries information of a network transmission speed, a DC-wander, a transmit amplitude, and a cable length and generates the first control signal, the first regulated voltage generated by the power regulating unit is transmitted to the center tap of the first side of the transformer; when the detecting and controlling unit detects that the received signal processed with a SNR and generates the second control signal, the second regulated voltage generated by the power regulating unit is transmitted to the analog circuit; and when the detecting and controlling unit detects a magnitude of an internal delay of the chip and generates the third control signal, the third regulated voltage generated by the power regulating unit is transmitted to the digital circuit.

11. The network transmitting apparatus according to claim 1, further comprising:
a first resistor, having a first end thereof coupled to a first end of the first side of the transformer; and
a second resistor, having a first end thereof coupled to a second end of the first resistor and a second end thereof coupled to a second end of the first side of the transformer.

12. The network transmitting apparatus according to claim 1, wherein the voltage is an operating voltage.

13. A power saving method of a network transmitting apparatus, wherein the network transmitting apparatus comprises a chip and a transformer, the chip comprises an analog circuit and a digital circuit, the power saving method comprising:
receiving a received signal;
detecting the received signal or a state of the chip to generate a first control signal, a second control signal or a third control signal;
respectively generating a first regulated voltage, a second regulated voltage or a third regulated voltage correspondingly according to the first control signal, the second control signal or the third control signal; and
respectively transmitting the first regulated voltage, the second regulated voltage or the third regulated voltage to a center tap of a first side of the transformer, the analog circuit, or the digital circuit.

14. The power saving method of a network transmitting apparatus according to claim 13, wherein when it is detected that the received signal carries information of a network transmission speed, a direct current (DC) wander, a transmit amplitude, and a cable length, the first regulated voltage is transmitted to the center tap of the first side of the transformer.

15. The power saving method of a network transmitting apparatus according to claim 13, wherein when it is detected that the received signal processed with a signal-to-noise rate (SNR), the second regulated voltage is transmitted to the analog circuit.

16. The power saving method of a network transmitting apparatus according to claim 13, wherein when a magnitude of an internal delay of the chip is detected the third regulated voltage is transmitted to the digital circuit.

17. The power saving method of a network transmitting apparatus according to claim 13, further comprising:
when detecting the received signal to generate the first control signal and the second control signal, generating the first regulated voltage and the second regulated voltage correspondingly according to the first control signal and the second control signal and transmitting the first regulated voltage and the second regulated voltage to the center tap of the first side of the transformer and the analog circuit respectively;
when detecting the received signal to generate the first control signal and the third control signal, generating the first regulated voltage and the third regulated voltage correspondingly according to the first control signal and the third control signal and transmitting the first regulated voltage and the third regulated voltage to the center tap of the first side of the transformer and the digital circuit respectively; and
when detecting the received signal to generate the second control signal and the third control signal, generating the second regulated voltage and the third regulated voltage correspondingly according to the second control signal and the third control signal and transmitting the second regulated voltage and the third regulated voltage to the analog circuit and the digital circuit respectively.

18. The power saving method of a network transmitting apparatus according to claim 17, wherein when it is detected that the received signal carries information of a network transmission speed, a DC-wander, a transmit amplitude, and a cable length, the first control signal is generated, and when it is detected that the received signal processed with a SNR, the second control signal is generated.

19. The power saving method of a network transmitting apparatus according to claim 17, wherein when a magnitude of an internal delay of the chip is detected, the third control signal is generated, and when it is detected that the received signal carries information of a network transmission speed, a DC-wander, a transmit amplitude, and a cable length, the first control signal is generated.

20. The power saving method of a network transmitting apparatus according to claim 17, wherein when a magnitude of an internal delay of the chip is detected, the third control signal is generated, and when it is detected that the received signal processed with a SNR, the second control signal is generated.

21. The power saving method of a network transmitting apparatus according to claim 17, wherein when detecting the received signal to generate the first control signal and the second control signal, the power saving method further comprises:
detecting the state of the chip to generate the third control signal;
generating the third regulated voltage correspondingly according to the third control signal; and
transmitting the first regulated voltage, the second regulated voltage, and the third regulated voltage to the center tap of the first side of the transformer, the analog circuit, and the digital circuit respectively.

22. The power saving method of a network transmitting apparatus according to claim 21, wherein when it is detected that the received signal carries information of a network transmission speed, a DC-wander, a transmit amplitude, and a cable length, the first control signal is generated and the first regulated voltage is transmitted to the center tap of the first side of the transformer; when it is detected that the received signal processed with a SNR, the second control signal is generated and the second regulated voltage is transmitted to the analog circuit; and when a magnitude of an internal delay of the chip is detected, the third control signal is generated and the third regulated voltage is transmitted to the digital circuit.

\* \* \* \* \*